US007418472B2

(12) United States Patent
Shoemaker et al.

(10) Patent No.: US 7,418,472 B2
(45) Date of Patent: Aug. 26, 2008

(54) SYSTEMS AND METHODS FOR DETERMINING REMOTE DEVICE MEDIA CAPABILITIES

(75) Inventors: Charles H. Shoemaker, Seattle, WA (US); Chia-Chi Teng, Redmond, WA (US); Hugh C. Vidos, Sammamish, WA (US); Jay C. Gibson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 10/674,706

(22) Filed: Sep. 30, 2003

(65) Prior Publication Data

US 2005/0080915 A1    Apr. 14, 2005

(51) Int. Cl.
*G06F 3/00* (2006.01)
*G06F 15/16* (2006.01)
(52) U.S. Cl. .................. 709/203; 709/227; 715/744
(58) Field of Classification Search ......... 709/227–228, 709/203–205; 715/733, 735, 740, 744–747
See application file for complete search history.

(56) References Cited

U.S. PATENT DOCUMENTS

| | | | | |
|---|---|---|---|---|
| 6,078,961 | A * | 6/2000 | Mourad et al. .............. | 709/235 |
| 6,509,913 | B2 * | 1/2003 | Martin et al. ............... | 715/762 |
| 6,915,486 | B2 * | 7/2005 | Li et al. ....................... | 715/765 |
| 6,965,682 | B1 * | 11/2005 | Davis et al. ................. | 382/100 |
| 7,027,881 | B2 * | 4/2006 | Yumoto et al. ............... | 700/65 |
| 7,136,909 | B2 * | 11/2006 | Balasuriya .................. | 709/220 |
| 2002/0075301 | A1 * | 6/2002 | Basso et al. ................. | 345/744 |
| 2002/0109718 | A1 * | 8/2002 | Mansour et al. ............. | 345/744 |
| 2003/0046401 | A1 * | 3/2003 | Abbott et al. ............... | 709/228 |

OTHER PUBLICATIONS

"Remote Desktop Protocol (RDP) Features and Performance" Microsoft white paper, Jun. 2000, pp. 1-15.*
Bayer, W. et al., "Komatsu Canada uses Terminal Server Edition to Cuts Costs and Gain a Standard User Interface", *ISI Analyzer*, 1998, 37(10), 1-6.
Wong, A.Y. et al., "Evaluating Windows NT Terminal Server Performance", *Proceedings of the 3rd USENIX Windows NT Symposium*, 1999, 145-154.

* cited by examiner

*Primary Examiner*—David Lazaro
(74) *Attorney, Agent, or Firm*—Woodcock Washburn LLP

(57) ABSTRACT

Systems and methods for providing a media device capabilities determination mechanism in a networked computing environment are provided. Some of today's operating systems and applications deliver a set of remoting features to enable a networked ecosystem of remote media consumption devices. These devices connect to the host and display a remoted media experience via remoting protocols and technologies. In this regard, the device capabilities determination mechanism of the invention enables a remote device to specify a custom set of media capabilities that should be remoted from the host to the remote device.

21 Claims, 9 Drawing Sheets

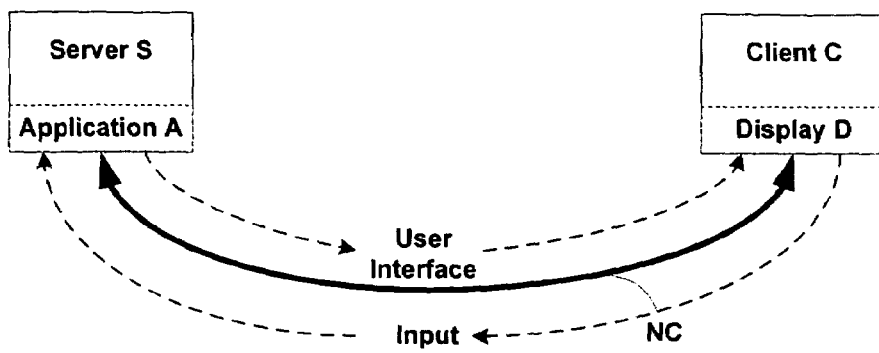
FIG. 1A - Prior Art
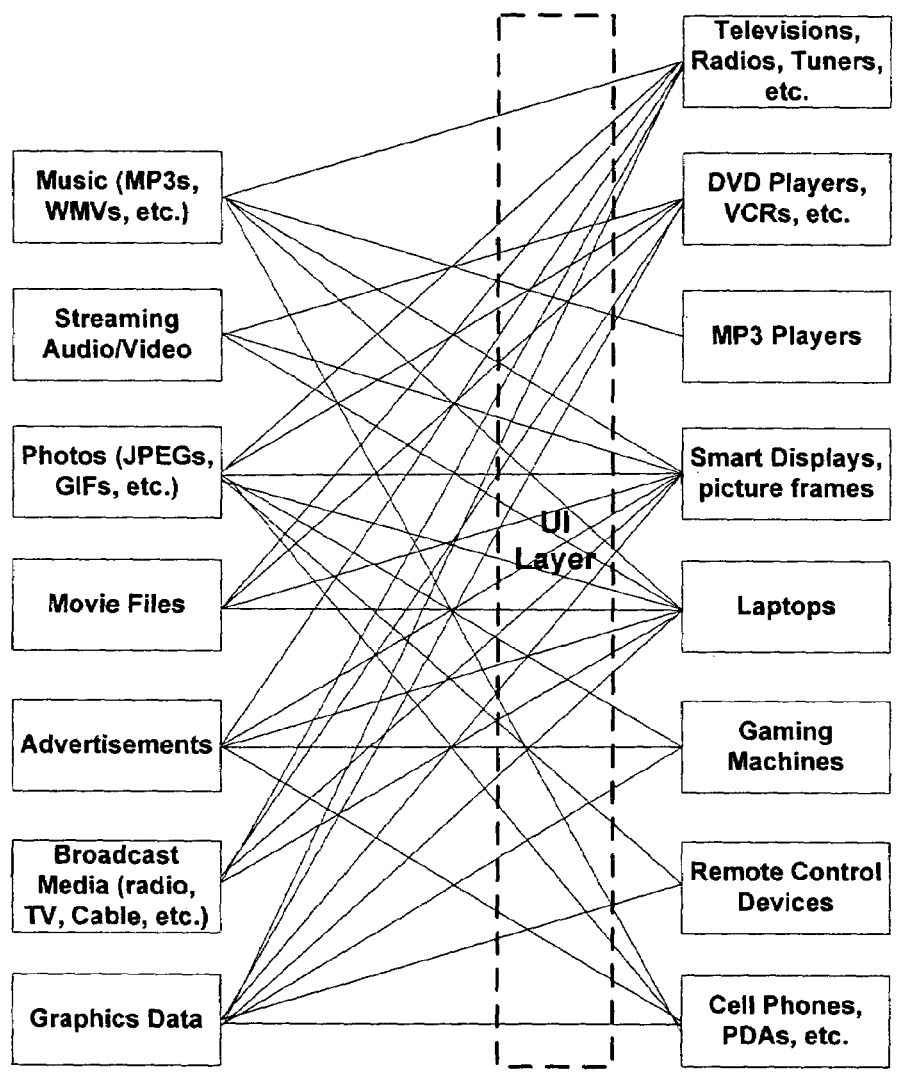
FIG. 1C

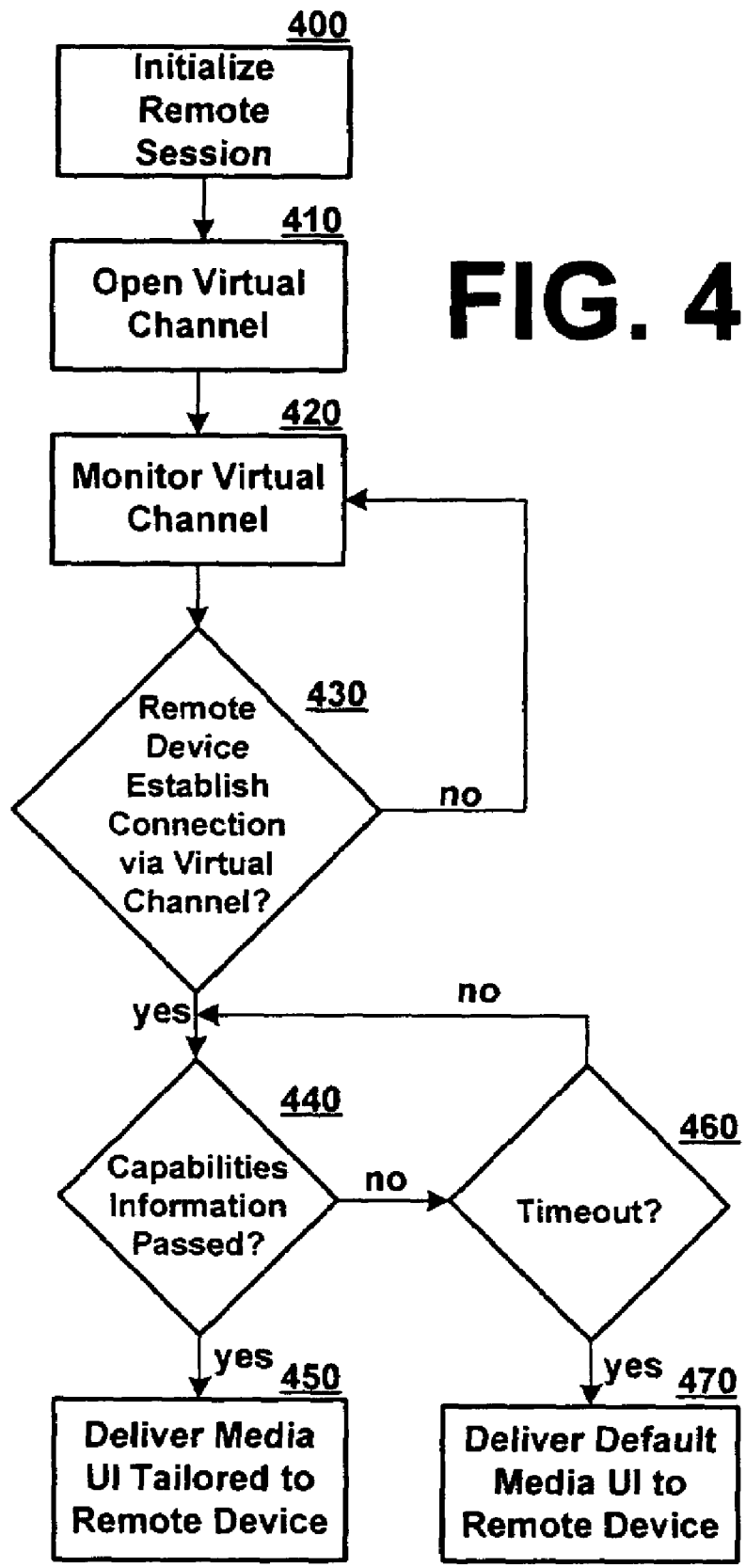

SYSTEMS AND METHODS FOR DETERMINING REMOTE DEVICE MEDIA CAPABILITIES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft Corp.

FIELD OF THE INVENTION

This invention relates to the remote provision of media and related media services from one computing device to a remote computing device. More particularly, the invention relates to a framework for remote devices to declare their media capabilities for purposes of a remote computing session.

BACKGROUND

Remote computing gives a computing system the capability to serve operating system-based applications to terminals and terminal emulators running on PC and non-PC desktops. Such an environment can be a thin-client architecture where application processing occurs mainly on a central server, but can be distributed as well. Because clients requesting access to such applications are available for many different desktop platforms (Macintosh, UNIX, and others), the server provides access to applications from virtually any desktop, and thereby provide enterprises and consumers alike with an extension to their computing environment with a lower total cost of ownership.

For instance, one type of remote computing, called multipoint computer application, enables sharing of applications among computers by allowing a view onto a computer application executing at one site to be advertised within a session to other sites. Such communication is achieved by way of a pre-defined protocol. Each site can, under specified conditions, take control of the shared computer application by sending remote input, such as remote keyboard and pointing device information. It thus enables remote viewing and control of a single application instance to provide the illusion that the application is running locally. Also, some types of "application sharing" remote computing provide for the synchronization, at multiple sites, of multiple instances of the same executing computer application. A session generally includes object(s) executing on one or more client entities which cooperate via a protocol to share one or more applications within the session. Such a protocol defines interactions among client entities and the session. Terminal Server and the Remote Desktop Protocol enable an exemplary remote computing environment.

FIG. 1A generally illustrates how remote computing, like the remote computing of Terminal Server, operates between a server and a client. Server S and client C communicate over any network connection NC, whether wired or wireless. Application A executes on the server S. A user interface, representing operations that can be performed in connection with Application A, is transmitted to the client C. The user interface is then rendered or displayed, e.g., Display D, on client C, and a user of client C can perform operations in connection with server S as if the application were running locally. Input to client C respecting Application A is transmitted back to server S via RDP or another protocol, received by the remote computing server software and the operation respecting Application A is performed on server S on behalf of client C.

Over the last decade, the media rendering functionality of host PCs has been evolving rapidly. Moreover, the number of formats of media, whether audio and/or video, that can be rendered by the host PC has been proliferating. Fortunately, storage has evolved alongside the media desktop to handle the increase in media, whether stored in connection with a streaming experience, or more permanently on disk. Consequently, it is desirable to port the media rendering capabilities of today's host PC desirable to remote devices.

Commonly assigned co-pending U.S. patent application Ser. No. 10/413,846 (the '846 application), filed Apr. 15, 2003, entitled "Application Program Interfaces and Structures in a Resource Limited Operating System," describes various techniques for remoting a media experience. As discussed in the '846 application, exemplary cooperation among computing devices to transmit a media experience rapidly and in high quality to one or more remote endpoints is shown in FIG. 1B and described below.

FIG. 1B provides a high-level overview of an exemplary operating environment 200 suitable for transmitting media to a remote device. A local PC 201 depicts a computing experience 202, which includes a user-interface component 204 and a media component 206. To transmit the computing experience 202 in high quality, the user interface is communicated through a user-interface channel 210 and the media component(s) 206 are communicated through a media channel 208 via network 211. A remote component 212 receives the user-interface component 204 and the media component 206 through their respective channels. The media and user-interface component are composited to render the computing experience 202 on a remote endpoint 213.

Local PC 201 can be a conventional PC, such as computer 110, as well as a variety of other computing devices. Other exemplary computing devices include a notebook computer, a tablet PC, or a server. Local PC 201 can be any consumer-electronics device capable of rendering media component 206. As will be described in greater detail below, local PC 201 can be used in connection with components to remotely distribute media presentations. Moreover, a DRM scheme enabled by local PC 201 can be applied to the distributed media presentations.

Computing experience 202, in a preferred embodiment, is a media experience that would be observed locally at PC 201. But computing experience 202 should not be construed as limited to a single instantiation. Rather, the present invention contemplates multiple computing experiences 202 that can each be instantiated and received by respective endpoints. Computing experience 202 includes both a user-interface component 204 and a media component 206.

User-interface component 204 includes graphics and images that typically compose a user interface. User-interface component 204 includes icons, host audio, background images and applications such as word-processing applications, spreadsheet applications, database applications, and so forth. Virtually any components that are not media components are part of user-interface component 204. Media Players and associated operating system media components are examples of software utilized in connection with user-interface component 204.

Media component 206 includes media-rich or bandwidth-intensive elements that compose a media event. The following is a nonexhaustive list of exemplary media components: a streaming media presentation, including video and/or audio presentation(s), a television program, including a cable television (CATV), satellite, pay-per-view, or broadcast program, a digitally compressed media experience, a radio program, a recorded media event (sourced by a VCR, DVD player, CD player, Personal Video Recorder and the like), a real-time media event, a camera feed and so on.

Thus, a user with local PC 201 located in a home office could use that PC to watch a streaming video program from the Internet on a television (a first remote endpoint 213) in the family room. Moreover, using the same PC, a child could simultaneously watch on another television set (a second remote endpoint 213) a video stored on local PC 201.

It is noted that these scenarios can be extended to a myriad of circumstances. For instance, a third user could simultaneously observe a camera feed inputted into local PC 201 that is remoted to a third remote endpoint 213. A fourth user could use local PC 201 to remote a fourth instantiation of computing experience 202 to watch a remoted television program on a monitor that does not have a TV tuner.

User-interface channel 210 communicates user-interface component 204 to remote component 212. Terminal Server and Terminal Client Services, offered by Microsoft Corporation of Redmond, Wash., provide an exemplary user-interface channel 210. Any remotable protocol can be used to transmit data through user-interface channel 210. Exemplary protocols include the T-120 series protocol and HTTP (Hyper Text Transfer Protocol).

Media channel 208 is separate from user-interface channel 210. Media channel 208 is used to transmit bandwidth-intensive experiences such as video and others listed above. Media component 206 provides a communications conduit for data to flow separate from user-interface component 204. Thus, the media component 206 is sent out of band with respect to the user-interface component, but synchronized. An exemplary protocol to transmit data through media component 206 includes, but is not limited to, the Transmission Control Protocol (TCP).

Network 211 can be any communications network, but is described in the context of a local area network (LAN). Today, LANs are offered in many varieties, including Ethernet, phone-wire networks, power-wire networks, and wireless networks. Wireless networks are not limited to radio and spread-spectrum networks and utilize protocols such as 802.11a, 802.11b, and 802.11g. An ordinary skilled artisan will readily appreciate these and other networks can also be used.

In each of the scenarios mentioned above, user-interface component 204 is presented on the respective remote endpoint 213 along with media component 206. This enables a remote user to remotely operate local PC 201. Typical actions that a remote user may desire to carry out include commands such as stop, fast forward, and rewind as well as conventional computer commands that enable actions such as resizing replay windows and adjusting volume and picture quality. In theory, it would work to have a standard set of input commands from which the user of a remote media device could choose, if remote media devices were standard, but as illustrated in FIG. 1C, both remote media devices and media types are diverse groups.

For exemplary purposes only, FIG. 1C illustrates that there are many kinds of media, such as music (MP3s, WMAs, etc.), streaming audio/video, photos (JPEGs, GIFs, etc.), movie files (MOVs, MPEGs, etc.), advertisements, broadcast media (radio, TV, cable, etc.), graphics data, etc. FIG. 1C also illustrates that there is a variety of devices that render media in some fashion, for some purpose. These devices include, but are not limited to, televisions, radios, tuners, DVD players, VCRs, MP3 players, Smart Display devices, laptops, gaming machines, remote control devices, cell phones, PDAs, digital picture frames, etc. The exemplary, non-limiting links between the media types and devices illustrate that each of the types of devices may or may not have the ability to render the type of media in question. Thus, the media rendering capabilities of the remote devices are diverse. Moreover, even if a device supports the ability to render a particular format, there is still a difference between the user interface capabilities presented at a host device versus the capabilities of a user interface presented at the remote device. It would be desirable to have a user interface abstraction layer for the translation of the user interface capabilities from the host device to the remote device.

For instance, an MP3 player may or may not be able to store or render video. A laptop may have significantly better storage, processing power and resolution than other devices. A universal remote device may have specialized touch screen capabilities. Thus, a user would benefit from automatic tailoring of the desktop media experience familiar to the user in a custom format that makes sense in view of the media capabilities of a select remote device. Today, no such ability exists, unless a developer hardwires unique server software and unique client software for achieving the objective with respect to a specific device.

It would thus be desirable to have a mechanism or framework for a remote device to declare its media rendering capabilities to a host device. It would be further desirable to have a mechanism or framework for a remote device to declare its user interface capabilities to a host device as they relate to the remote device's media experience. Accordingly, there is a great need in the art for a remote computing mechanism, enabling a remote device to declare capabilities as they relate to media in a computing system including at least one host device, and one or more remote devices.

SUMMARY OF THE INVENTION

In consideration of the above-identified shortcomings of the art, the present invention provides systems and methods for providing a media device capabilities determination mechanism in a networked computing environment. Some of today's operating systems and applications deliver a set of remoting features to enable a networked ecosystem of remote media consumption devices. These devices connect to the host and display a remoted media experience via remoting protocols and technologies. In this regard, the device capabilities determination mechanism of the invention enables a remote media consumption device to specify a custom set of media capabilities that should be remoted from the host to the remote media consumption device. The mechanism is dynamic and extensible.

Other advantages and features of the invention are described below.

BRIEF DESCRIPTION OF THE DRAWINGS

The systems and methods for declaring media capabilities in accordance with the present invention are further described with reference to the accompanying drawings in which:

FIG. 1A illustrates an exemplary prior art remote computing environment;

FIG. 1C illustrates how diverse media types and media devices are when it comes to providing a media experience;

FIG. 4 is a flow diagram of an exemplary, non-limiting embodiment of the media capabilities declaration mechanism of the invention;

DETAILED DESCRIPTION OF THE INVENTION

Overview

Figure 1B:
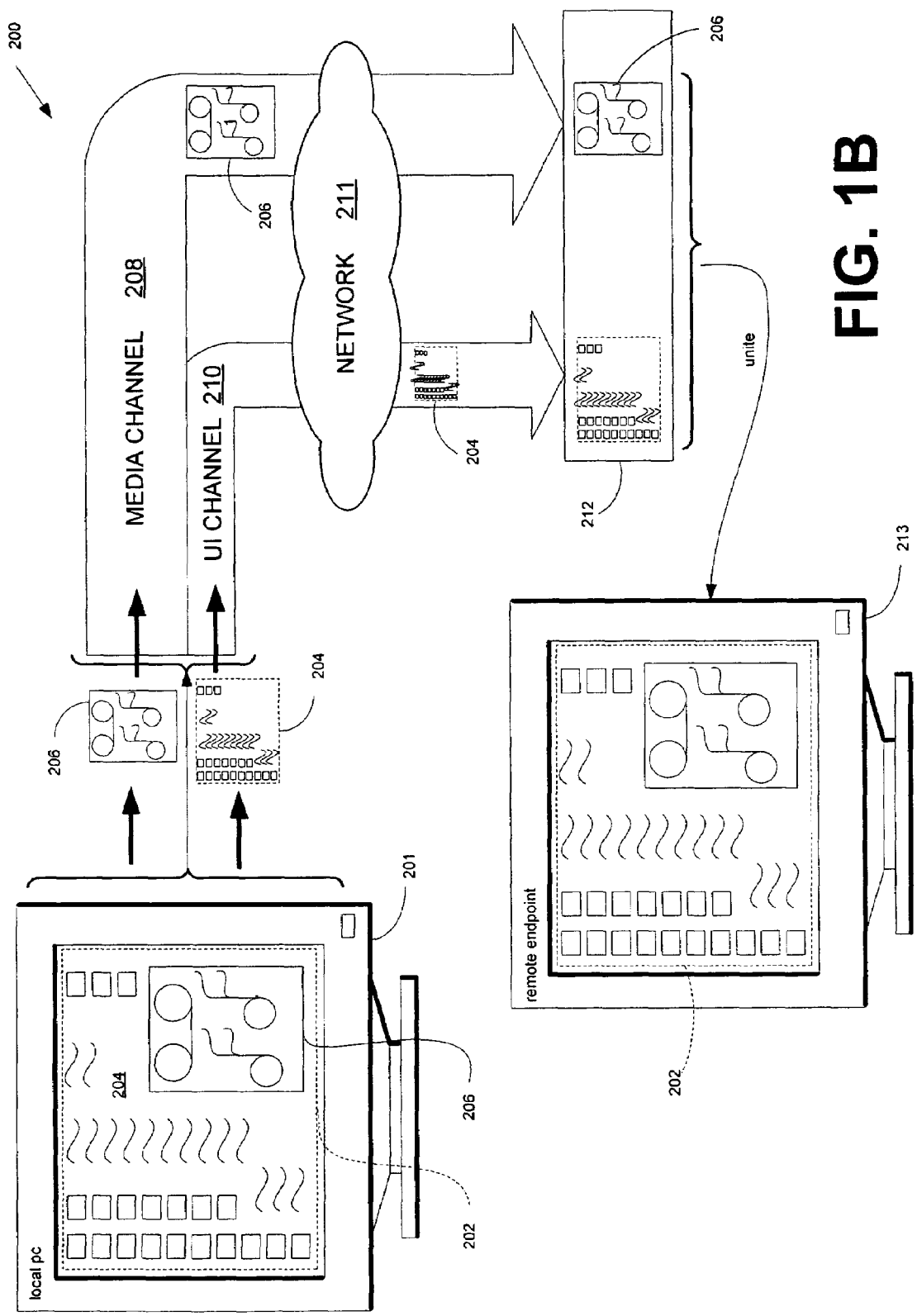
FIG. 1B illustrates an exemplary remote computing environment for remoting a media experience to a remote device.

Recent improvements in the way consumers interact with their computers include the introduction of a broad ecosystem of networked devices that deliver entertainment experiences (such as TV, music, videos, photographs, DVD's, etc) throughout the home on a variety of devices (such as electronic home remote media devices, Smart Displays, xBoxes, pocket PCs, portable DVD devices, and the like). In order to optimize the media experience enabled by a host PC for the class of session onto which it is remoted, the capabilities of the session, based on the capabilities of the device, must be known. Today, the differences between devices such as typical remote media devices, Smart Displays, generic TS sessions, etc. are well understood. Accordingly, different classes of sessions require different remote media sessions. Over time, media will be remotely accessed by a greater variety of devices (e.g., xBox, Pocket PC, portable DVD players, etc). As described in more detail below, the mechanism for determining device capabilities of the invention satisfies these needs.

As mentioned, some of today's operating systems, such as Windows® Media Center Edition (MCE), deliver a rich set of remoting features to enable an ecosystem of remote media consumption devices. These devices connect to the host, such as an MCE PC, and display a remoted media experience via Terminal Services or other remoting technologies. To enhance such an ecosystem, the automatic device capabilities declaration and determination mechanism of the invention enables a remote device to specify a custom set of media capabilities and corresponding UI that should be remoted to the device.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with a remote media experience in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. With network sources for digital media proliferating more than ever, the invention is particularly relevant to those computing devices operating in a network or distributed computing environment, and thus the media capabilities declaration techniques in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power and storage to benefit the entire enterprise. In this regard, a variety of devices may have applications, objects or resources that may implicate the media capabilities determination processes of the invention.

Figure 2A:
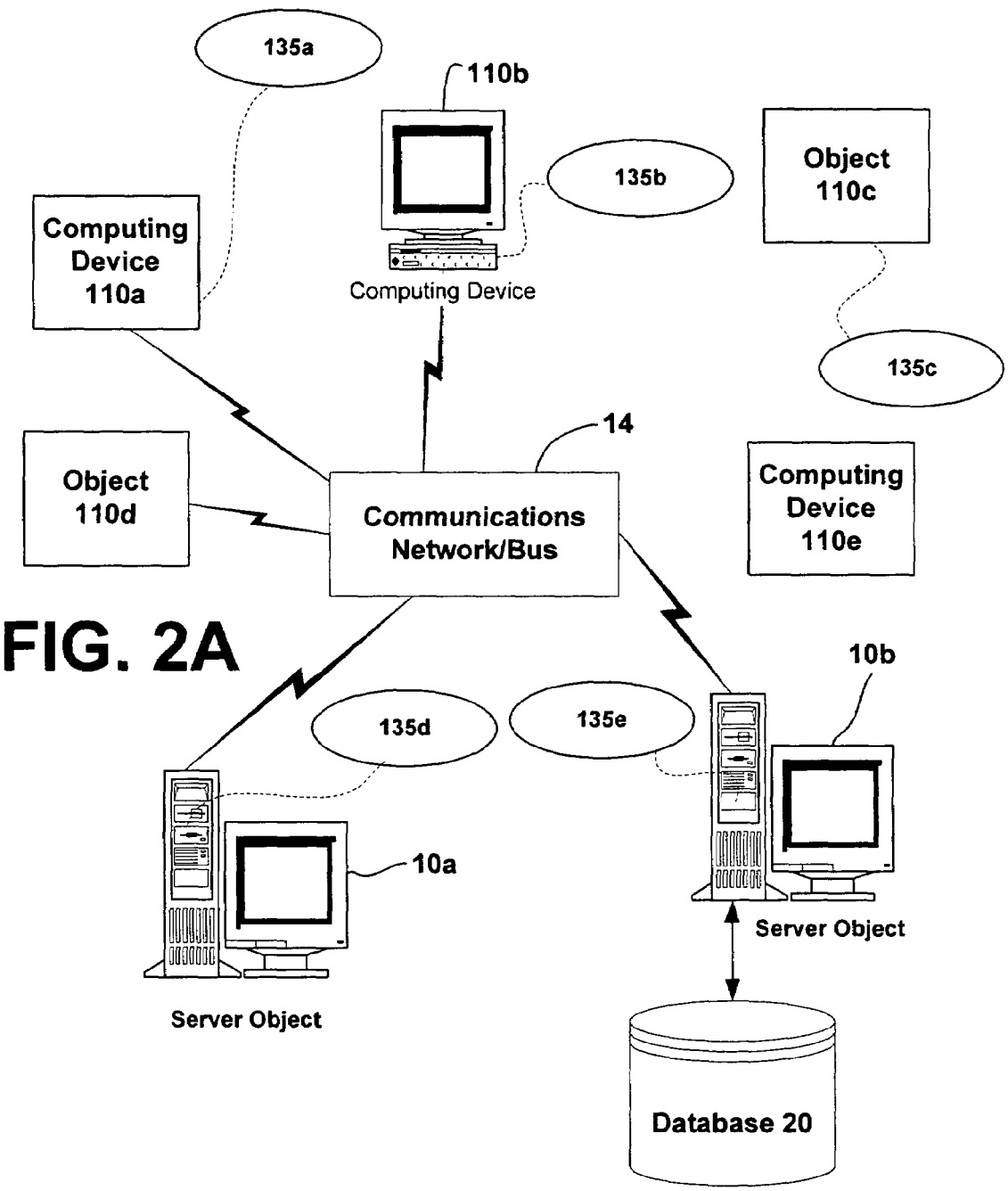
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each of the objects 10a, 10b, etc. or 110a, 110b, 110c, etc. may contain an application that might make use of an interface, such as an API, or other object, software, firmware and/or hardware, to request or make use of the media capabilities determination processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects, or any device that may be utilized in connection with a media experience.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the provision of remote media experience(s) according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which request or make use of the media capabilities declaration and determination mechanism(s) in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. For instance, computer 110a may be an MCE host PC, and computing devices 10a, 10b, etc. may be remote media consumption devices. Any of these computing devices may be processing data or requesting services or tasks that may implicate the media capabilities determination mechanism(s) of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the media capabilities determination techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." For instance, RDP is a common protocol utilized for remote computing. Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device with unique media abilities when it comes to storage, user interface, rendering, etc.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
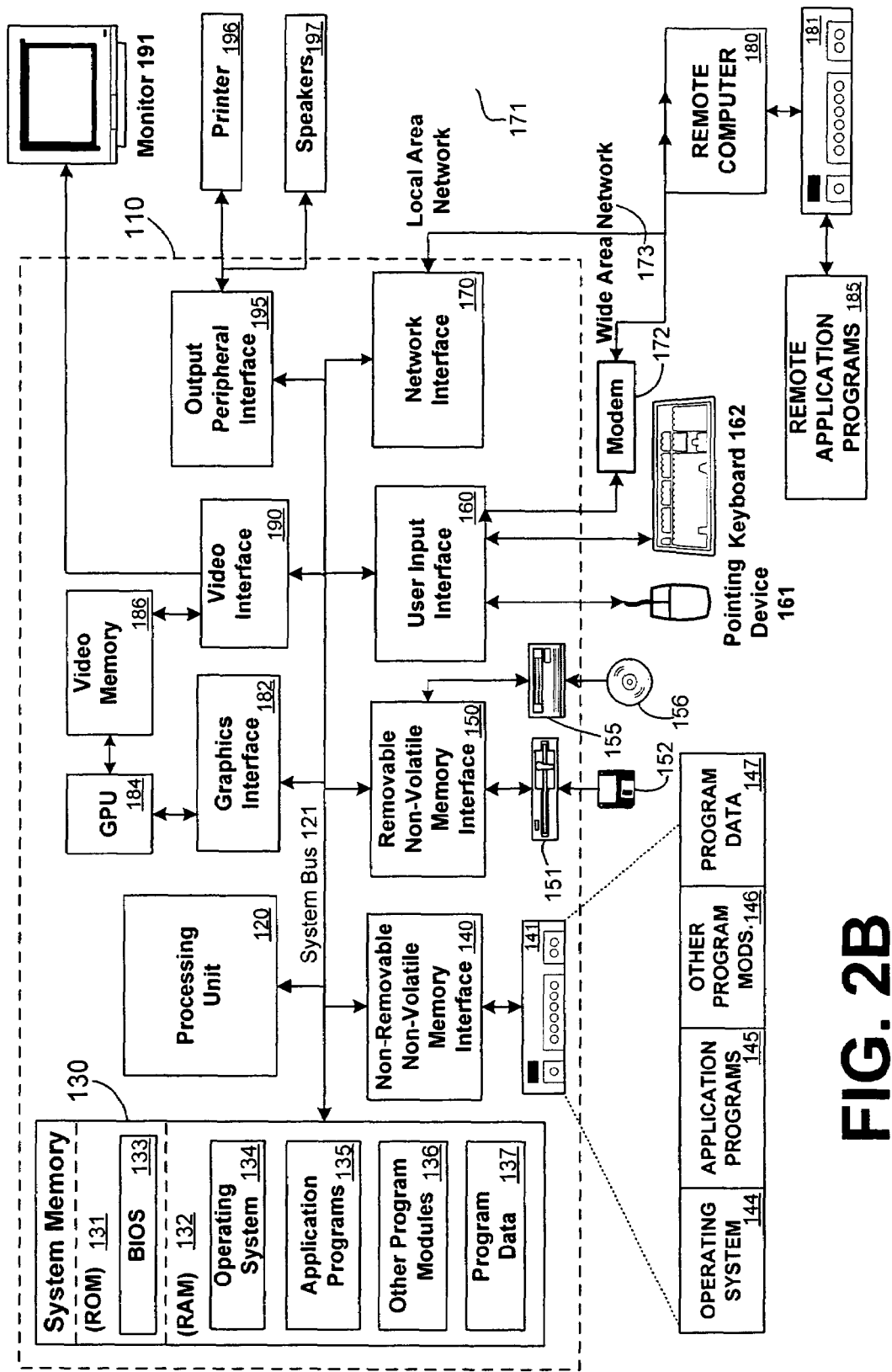
FIG. 2B is a block diagram representing an exemplary non-limiting server computing device in which the present invention may be implemented.

FIG. 2B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that media may be experienced in a computing environment. While a general purpose computer is described below as an exemplary host, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the delivery of a custom media experience in accordance with the invention.

Although not required, the invention can be implemented via an operating system, for use by a developer of services for a device or object, and/or included within application software that operates in connection with the receipt of a capabilities declaration or delivery of a custom media experience in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Remote Device

Figure 2C:
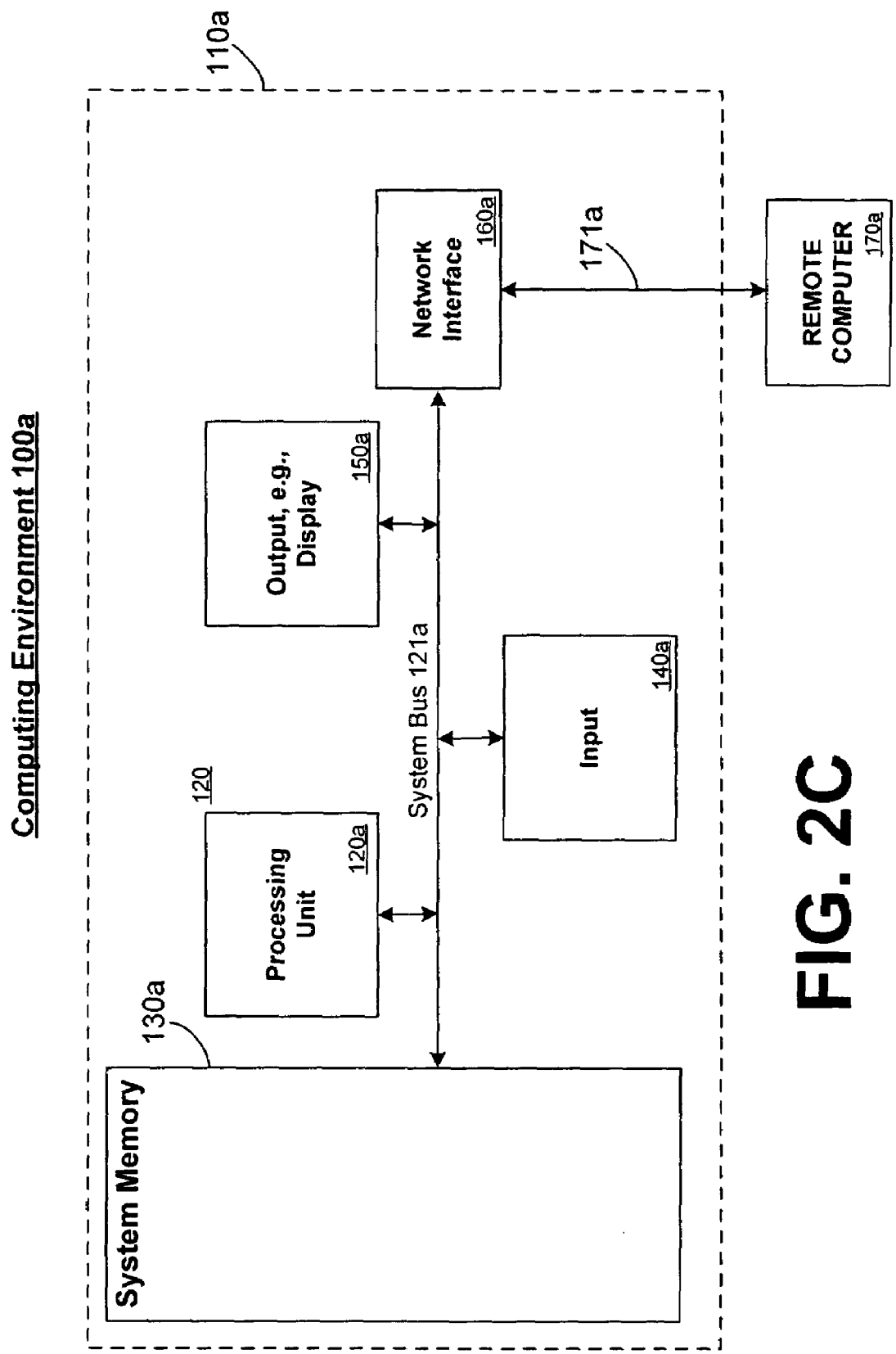
FIG. 2C is a block diagram of a generic remote device in connection with which the present invention may be implemented to enable the generic remote device to declare its media capabilities.

FIG. 2C and the following discussion are intended to provide a brief general description of a suitable computing environment for a remote media device in accordance with the invention. It should be understood, however, that handheld, portable and other computing devices and computing objects of all kinds are contemplated for use in connection with the present invention, i.e., anywhere that a device may wish to request the delivery of a custom remote media experience for the device. The differences in these devices in terms of media capabilities makes use of the invention of significant advantage—to tailor remote media experiences to different remote devices. Accordingly, the below general purpose remote computer described below is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the remote media experience techniques in accordance with the invention.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 2C thus illustrates an example of a suitable computing system environment 100*a* in which the invention may be implemented, although as made clear above, the computing system environment 100*a* is only one example of a suitable computing environment for a remote device and is not intended to suggest any limitation as to the scope of use or functionality of the invention. Neither should the computing environment 100 be interpreted as having any dependency or requirement relating to any one or combination of components illustrated in the exemplary operating environment 100*a*.

With reference to FIG. 2C, an exemplary remote device for implementing the invention includes a general purpose computing device in the form of a computer 110*a*. Components of computer 110*a* may include, but are not limited to, a processing unit 120*a*, a system memory 130*a*, and a system bus 121*a* that couples various system components including the system memory to the processing unit 120*a*. The system bus 121*a* may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121 by a removable memory interface, such as an interface.

A user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 2C include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods of the invention may be included in, supported in or accessed via all of the languages and services enabled by managed code, such as .NET code, and in other distributed computing frameworks as well.

Overview of Remote Desktop Protocol and Terminal Server Sessions

The Microsoft Remote Desktop Protocol (RDP) is one example of a protocol that can be used to port a media experience from a host to a remote media consumption device. RDP provides remote display and input capabilities over network connections for Windows-based applications running on a server. RDP is designed to support different types of network topologies and multiple LAN protocols.

On the server, RDP uses its own video driver to render display output by constructing the rendering information into network packets using the protocol and sending them over the network to the client. On the client, RDP receives rendering data and interprets the packets into corresponding graphics device interface API calls. For the input path, client mouse and keyboard events are redirected from the client to the server. On the server, RDP uses its own virtual keyboard and mouse driver to receive the keyboard and mouse events. From a non-limiting feature standpoint, RDP includes encryption, bandwidth reduction features, roaming disconnect, clipboard mapping, print redirection, virtual channels, remote control and network load balancing.

Terminal Server provides an exemplary remote computing environment as an extension of a server, such as Windows NT Server. With merely a thin client, users can experience the server desktop operating system and applications completely off the server. With Terminal Server, users are provided access to Windows-based applications from any of the following types of desktops: (A) low-cost hardware, commonly referred to as Windows-based terminals, which are marketed by third-party hardware vendors, (B) Windows desktop operating systems, such as Windows 95 or Microsoft Windows NT Workstation by running the Terminal Server client as a window within the local desktop environment, and (C) X-based Terminals, UNIX-based desktops as well as Apple Macintosh, MS-DOS and other networked computers (through add-on software).

Terminal Server comprises three main components: the Terminal Server multiuser core, the Remote Desktop Protocol (RDP) and the thin client software.

Terminal Server is the multiuser server core that provides the ability to host multiple, simultaneous client sessions on other devices. Terminal Server is capable of directly hosting compatible multiuser client desktops running on a variety of Windows-based and non-Windows-based hardware. Standard Windows-based applications do not need modification to run on the Terminal Server, and all standard Windows NT-based management infrastructure and technologies can be used to manage the client desktops. In this way, corporations can take advantage of the rich choice of applications and tools offered by the Windows environment.

RDP is the protocol of Terminal Server that allows a thin client to communicate with the Terminal Server over the network. This protocol is based on the International Telecommunications Union (ITU) T.120 protocol, an international, standard multichannel conferencing protocol. RDP is tuned for high-bandwidth enterprise environments and also supports encrypted sessions.

The thin client component is software that presents, or displays, a Windows user interface on a range of desktop hardware including Windows-based terminal devices and personal computers.

An Object Manager of Terminal Server provides that applications and system programs of different sessions do not collide. Every object name created within a session is appended with a unique identifier number associated with the individual session that created it (SessionID). The Terminal Server service is entirely protocol-independent, so it can function using RDP or a third-party add-on protocol such as Citrix's ICA.

RDP is a multichannel capable protocol allowing for separate virtual channels for carrying serial device communication and presentation data from the server, as well as encrypted client mouse and keyboard data. Virtual channels are software extensions that can be used to add functional enhancements to a Terminal Services application. Examples of functional enhancements might include: support for special types of hardware, audio, or other additions to the core functionality provided by the Terminal Services RDP. RDP provides multiplexed management of multiple virtual channels.

A virtual channel application has two parts, a client-side component and a server-side component. The server-side component is an executable program running on the Terminal Server. The client-side component is a DLL that is loaded into memory on the client computer when the Terminal Services client program runs.

Virtual channels can add functional enhancements to a Terminal Services client, independent of the RDP protocol. With virtual channel support, new features can be added without having to update the client or server software, or the RDP protocol.

Several other capabilities are also part of the T.120 standards definition, including, for example, multipoint data delivery, which allows data from an application to be delivered "real-time" to multiple parties. Multicast-enabled delivery allows for reliable delivery services of data transmissions. It increases the performance for the customer while at the same time reducing the load on the network infrastructure. RDP is beneficial for connectivity purposes because it provides an extensible base from which to build more abilities. This is in part because RDP provides up to 64,000 separate channels for data transmission, as well as provisions for multipoint transmission.

RDP is designed to support many different types of Network topologies, such as ISDN, POTS, and many LAN protocols, such as IPX, Netbios, TCP/IP, and so forth.

The activity involved in sending and receiving data through the RDP stack is essentially the same as the seven-layer OSI (open systems interconnection) model standards for common LAN networking today. Data from an application or service to be transmitted is passed down through the protocol stacks, sectioned, directed to a channel, encrypted, wrapped, framed, packaged onto the network protocol, and finally addressed and sent over the wire to the client.

The return data works the same way in reverse, with the packet being stripped of its address, then unwrapped, decrypted, and so on, until the data is presented to the application for use. Some portions of the protocol stack modifications occur between the 4th and 7th layers, where the data is encrypted, wrapped and framed, directed to a channel, and prioritized.

With RDP, advantageously, the complexities of dealing with the Protocol stack are abstracted away from the application developer. The application developer simply writes the application, and the RDP stack implemented by the Terminal Server and its client connections takes care of the rest.

When starting, Terminal Server boots and loads the core operating system, and the Terminal Server service is started and begins waiting for session connections. Each connection is given a unique session identifier or "SessionID," to represent an individual session to the Terminal Server and each process created within a session is "tagged" with the associated SessionID to differentiate its namespace from other session namespaces. When a user logs on to a Terminal Services-enabled computer, a session is started for the user, identified by unique session ID. Because each logon to a Terminal Services client receives a separate session ID, the user-experience is similar to being logged on to multiple computers at the same time, e.g., an office computer and a home computer.

The console (Terminal Server keyboard, mouse, and video) session is the first to load and is treated as a special-case client connection and assigned SessionID0. The console session starts as a normal system session, with the configured display, mouse, and keyboard drivers loaded.

After creating the console session, the Terminal Server service then calls the Session Manager to create two (by default) idle client sessions awaiting client connections. To create the idle sessions, the Session Manager executes the client server run-time subsystem process, and a new SessionID is assigned to that process.

Unlike the console session, client sessions are configured to load separate drivers for the display, keyboard, and mouse. The new display driver is the Remote Desktop Protocol (RDP) display device driver, and the mouse and keyboard drivers are replaced with the RDP driver. These drivers allow the RDP client session to be both available and interactive, remotely. Finally, Terminal Server also invokes a connection listener thread for the RDP protocol, which listens for RDP client connections on a TCP port. Processes with different SessionIDs are prevented from accessing another session's data.

In an exemplary implementation, the client initiates a connection to the Terminal Server through the TCP port. The Terminal Server RDP listener thread detects the session request and creates a new RDP stack instance to handle the new session request. The listener thread hands over the incoming session to the new RDP stack instance and continues listening on the TCP port for further connection attempts. Each RDP stack is created as the client sessions are connected to handle negotiation of session configuration details.

After user logon, the desktop, or application, if in single application mode, is displayed for the user. When the user selects an application to run, the mouse commands are passed to the Terminal Server, which launches the selected application into a new virtual memory space.

If a user decides to disconnect the session, the processes and all virtual memory space remain and are paged off to the physical disk if physical memory is required for other processes. An additional benefit of RDP is that of being able to change session screen resolutions, depending on what the user requests for the session. For example, if a user had previously connected to a Terminal Server session at 800×600 resolution and disconnected, and then moved to a different computer that only supported 640×480 resolution and reconnected to the existing session, the desktop would be redrawn to support the new resolution.

Logoff is typically very simple to implement. Once a user logs off from the session, all processes associated with the SessionID are terminated and any memory allocated to the session is released.

Declaration and Determination of Media Capabilities of a Remote Device

As mentioned, some of today's operating systems, e.g., Windows® Media Center Edition (MCE), deliver a rich set of remoting features to enable an ecosystem of remote media consumption devices. These devices connect to the host, such as an MCE PC, and display a remoted experience via Terminal Services and RDP or other remoting technologies. The device capabilities determination mechanism of the invention thus enables a remote device to specify the custom set of media capabilities that should be remoted to the device.

As discussed, in order to optimize a host PC media experience for the class of session onto which it is remoted, the capabilities of the session based on the device are declared by the remote device in accordance with the invention. Different classes of sessions are thus provided with different media experiences. The mechanism for declaring and determining device capabilities in accordance with the invention enables configuration of the media experience appropriately for the remote device.

Figure 3A:
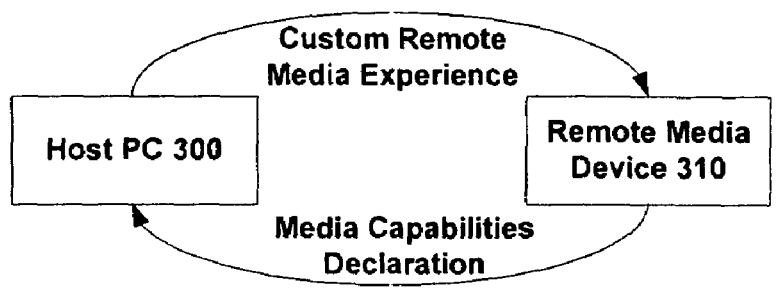
FIGS. 3A and 3B are block and flow diagrams, respectively, of exemplary embodiments of the extensible media capabilities declaration mechanism of the invention.
Figure 3B:
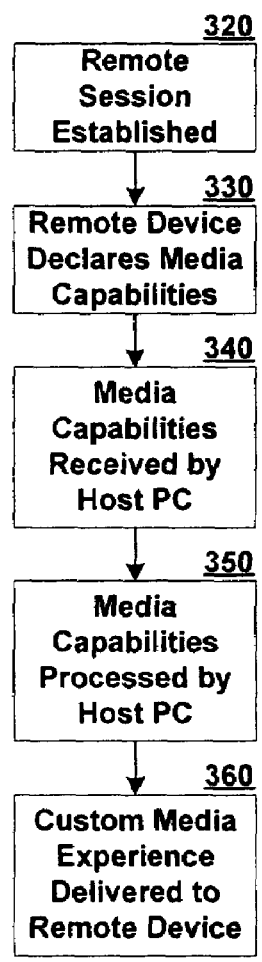

FIGS. 3A and 3B illustrate exemplary block and flow diagrams, respectively, for a variety of embodiments of the present invention. FIG. 3A illustrates that that a remote media device 310 declares its media capabilities according to a framework understood by the host PC 300. Host PC 300, interpreting the capabilities declaration by rules dictated by the framework, can then deliver a custom media experience to the remote device. FIG. 3B illustrates exemplary procedure for the exchange between host PC 300 and remote media device 310. At 320, a remote computing session is created according to the protocol, such as RDP, being used between host 300 and device 310. At 330, the device 310 declares a set of media functionality it possesses via the mechanism of the invention. At 340, the host receives the declaration and at 350, the host translates the declaration into a tailored set of media functionality that is understood by the host 300 to apply to the delivery of a media experience to the remote device 310 during the session.

In exemplary embodiments and illustrated in the flow diagram of FIG. 4, the capabilities determination mechanism works as follows. At 400, an RDP session is initialized, and at 410, the host PC opens a virtual channel and monitors the channel at 420 until a timeout period, e.g., 60 seconds, completes. If the remote client establishes a connection via this virtual channel at 430 and passes in the capabilities string for the device at 440, the media center UI is presented to the remote device with the appropriate functionality enabled at 450. If no valid capabilities string is transferred within the timeout period as determined at 460, a generic set of device capabilities is assumed at 470. An exemplary, non-limiting default set is defined in Table I below. In one embodiment, the capabilities string is passed to the host PC via a virtual channel defined by RDP.

TABLE I

Exemplary Media Capabilities Properties and Device Settings

| Property Name | Token | Description | Not Re-moted | Generic PC | Media Device | Smart Display | Tablet PC | Pocket PC | xBox |
|---|---|---|---|---|---|---|---|---|---|
| AreAdvancedPhotoFeaturesAllowed | PHO | Is photo printing and photo editing allowed on this client | T | T | F | T | T | ? | ? |
| AreMouseMoveEventsNotTrackingMouse | MOU | Are new MouseMove events generated while the mouse is moving? Or is this a "Tablet" device & a move event is generated immediately before a select event | F | F | F | F | T | F | F |
| AreOverscanMarginsNeeded | MAR | Are overscan margins needed when displaying the UI? (for display on TVs) | F | F | T | F | F | F | ? |
| ArePopupsAllowed | POP | Are HTML popups allowed? | T | T | F | T | T | ? | F |
| ClientName | NAM | The Name of the current client | | | | | | | |
| Is10FootHelpAllowed | H10 | Is in-proc help allowed on this client | T | T | F | T | T | ? | F |
| Is2FootHelpAllowed | H02 | Is HTML help allowed on this client | T | T | F | T | T | T | F |
| IsAudioAllowed | AUD | Is audio (Music/FM) allowed on this client | T | T | T | T | T | T | T |
| IsAudioNonWMP | AUR | Is audio sent out of band (not using WMP) | F | F | T | T | F | F | T |
| IsBlackLetterBoxNeeded | BLB | Is a black letterbox needed for displaying video? | F | F | T | T | F | F | T |
| IsCCRenderedByClient | CCC | Is CC data rendered by the display? Or Media Center? | T | F | T | T | F | F | T |
| IsCDCopyingAllowed | CPY | Is CD Ripping allowed on this client | T | T | F | T | T | ? | ? |
| IsCDPlaybackAllowed | CDA | Is CD playback allowed on this client | T | T | F | T | T | ? | ? |
| IsDVDPlaybackAllowed | DVD | Is DVD playback allowed on this client | T | T | F | F | F | F | F |
| IsFPDAllowed | FPD | Can status events be sent to the FPD? | T | F | F | F | F | F | F |
| IsGDIRendererUsed | GDI | Is Media Center rendering using GDI? Or D3D? | T | T | F | F | F | F | F |
| IsInputTreatedAsIfFromRemote | REM | Input from the remote control is being mapped to virtkeys and then RDP pipes them to the PC. If this is true, then the command should be treated as if it came from the remote and not the keyboard. | F | F | T | F | F | F | ? |
| IsIntensiveAnimationAllowed | ANI | Is high-bandwidth animation (i.e., animating page layouts) allowed? | T | F | F | F | F | F | F |
| IsIntensiveRenderingAllowed | REN | Is high-bandwidth rendering (ie. audio visualizations) allowed on this client | T | F | F | F | F | F | F |
| IsToolbarAllowed | TBA | Can the 2" toolbar be displayed? | T | T | F | T | T | ? | ? |
| IsToolbarPersisted | TBP | Is the 2" toolbar always visible? | F | F | F | T | F | F | F |
| IsTrayAppletAllowed | APP | Is the tray applet allowed on this client | T | T | F | T | T | ? | F |
| IsTVSkinUsed | TVS | Is the TV skin being used on this client? (for better display on TVs) | F | F | T | F | F | F | T |
| IsVideoAllowed | VID | Is video (TV/My Videos) allowed on this client | T | F | T | F | F | F | T |
| IsWebContentAllowed | WEB | Is loading HTML pages allowed on this client | T | T | T | T | T | ? | ? |
| IsWin32ContentAllowed | W32 | Is loading win32 applications allowed on this client | T | T | F | T | T | ? | F |
| IsWindowModeAllowed | WIN | Can Media Center run windowed? Or is it restricted to full screen? | T | T | F | T | T | ? | F |

Figure 5:
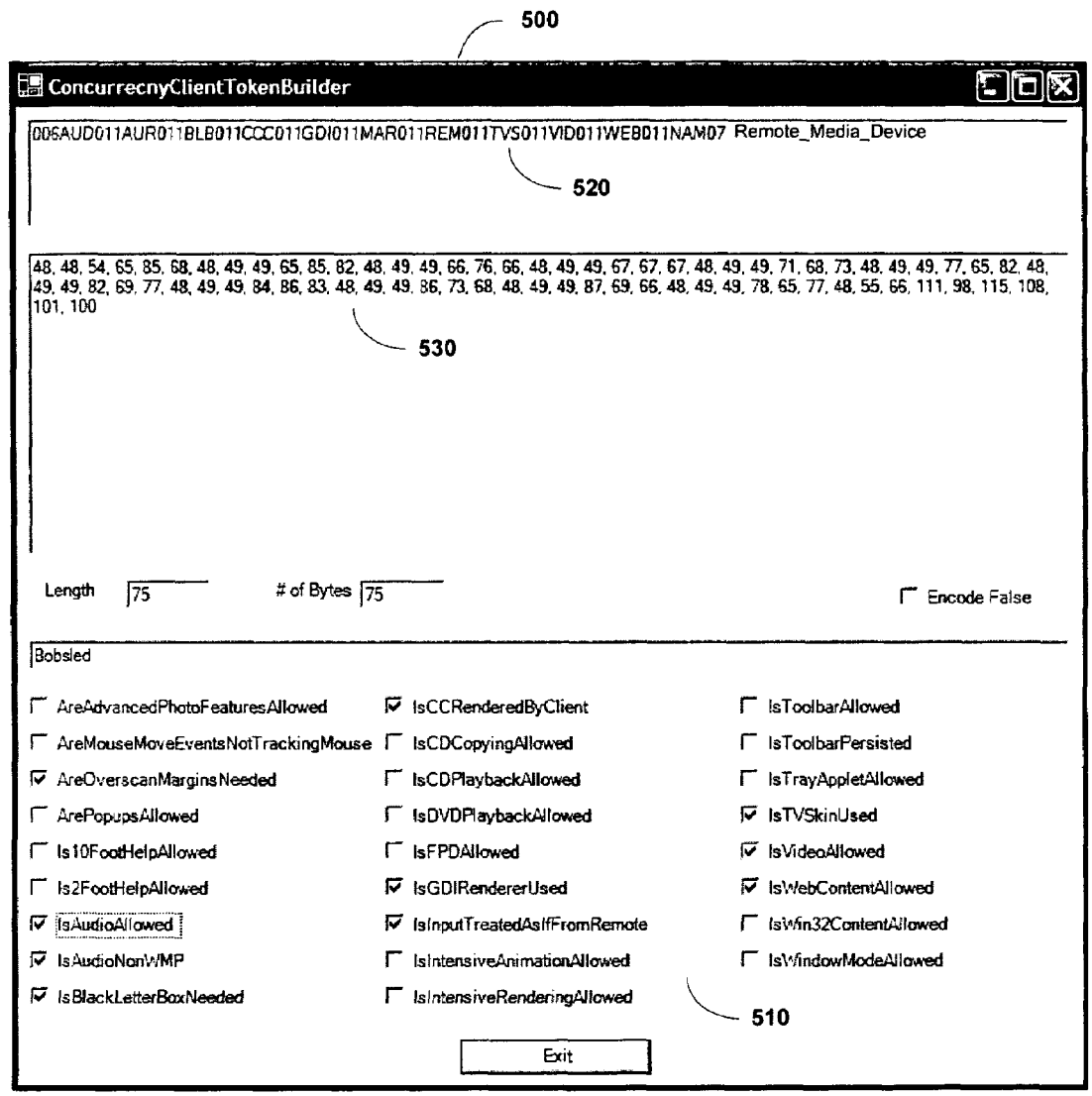
FIG. 5 illustrates an exemplary, non-limiting user interface for a tool for building the media capabilities token(s) of the invention.

To facilitate creation of a client's capabilities string, in another embodiment, the invention provides a client capabilities token builder (CCTB) tool 500, as shown with an exemplary UI in FIG. 5. The CCTB tool 500 is used to create a set of token(s) that communicate device capabilities to the host PC. To create the token(s), one simply selects the relevant device capabilities from a list 510 and assigns a friendly name to the device, if applicable ('Remote_Media_Device' is the friendly name in FIG. 5, which is also utilized herein to refer to an exemplary remote media device that may be used in connection with the present invention). The values for the capability token(s) are displayed in a first field 520. The UTF-8 encoded manifestation of this string is displayed in a second field 530. In this embodiment, the UTF-8 encoded string is passed to the host PC via a virtual channel to specify device capabilities. It is noted that any format could be used to describe the values of the first field 520, and so the invention should not be construed to be limited to the use of a UTF-8 encoding scheme.

Figure 6:
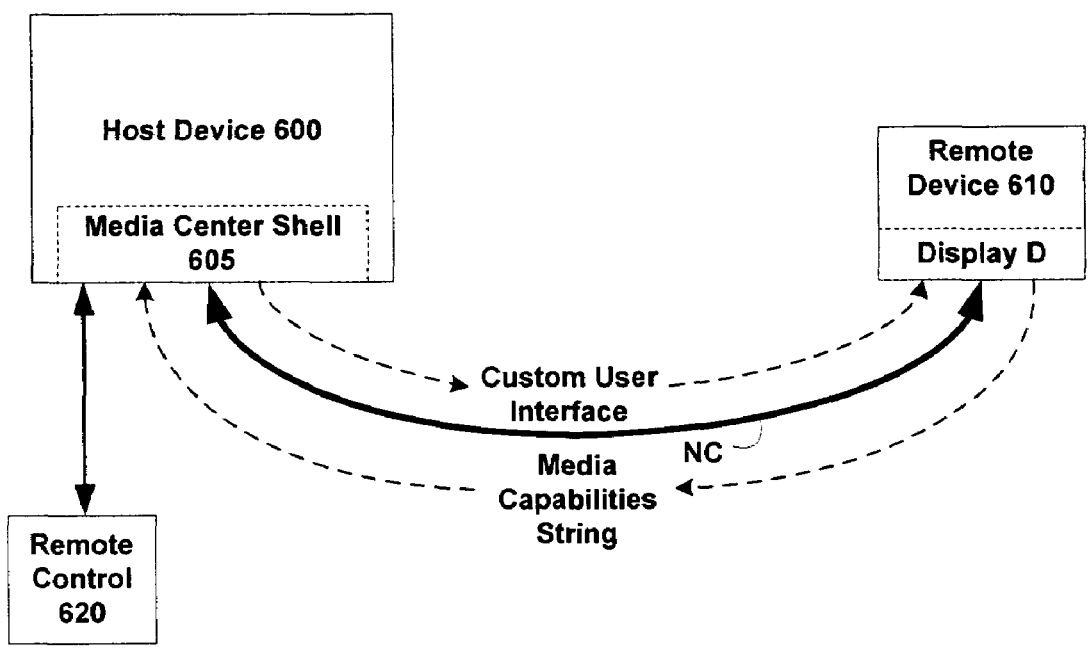
FIG. 6 illustrates the use of the invention in connection with a host device having a shell for use with a generally local remote control experience.

FIG. 6 illustrates an embodiment of the invention wherein the host PC media environment has a "10-foot UI" media experience. In this embodiment, host PC 600 has a media shell 605 that is designed to work with a remote control device 620. Thus, rather than need to be at the keyboard, mouse, etc. of the host PC 600, the user may operate the media center of the host PC 600 via the remote control device 620. Since the remoting of a media experience is designed to be seamless and automatic in accordance with the invention, in the present embodiment, after a remote device 610 sends its media capabilities string to the host device 600, and after a custom media experience is remoted to the device 610, remote device 620 may be utilized to control any portion of the media experience, i.e., at either host PC 600 or remote device 610, because the remote experience is tied to the "10 foot UI" media shell 605.

Another key aspect of the invention is that it provides an extensible mechanism for declaring media capabilities. While RDP itself has a broadcast mechanism for certain device capabilities, it is not an extensible mechanism, and it is not targeted for the remote media experience. In this regard, while media scenarios between host and remote device have been hardwired in the past, to the extent that a new remote media consumption device necessitates a new class of media property to be set, the invention can be modified to accommodate the new capabilities set. For instance, the tool 500 can be modified to include additional properties, and the corresponding media capabilities string will be generated and interpreted accordingly. In other words, the string itself is extensible, making for an unlimited number of potential media properties.

Moreover, the invention is dynamic, i.e., if a remote device has an established session with a host PC, and the remote device becomes disconnected from the network for some reason, if in the meantime, a media property has changed, then upon reconnection, the invention dynamically adapts the media capabilities string to the new conditions of the device. Thus, for instance, if after disconnection of a remote device, the remote device is attached to a monitor having greater screen resolution, upon reconnection, the greater screen resolution declared via a media capabilities string according to the invention.

Exemplary Remoting Exceptions for an Exemplary Device

As illustrated by the differences in devices and properties shown in Table I, there are some media features on a host PC that either cannot be remoted to remote media device(s) or are handled in a special way when remoted. The media capabilities determination mechanism(s) of the invention enable such exceptions to exist, and to be automatically and dynamically handled during a remote media experience session.

For a concrete example, a remote device with no keyboard or mouse, called Remote_Media_Device, is considered herein that enables a user to wirelessly remote desktop media experiences to the Remote_Media_Device in a variety of scenarios, e.g., to watch television, listen to music, look at photos, etc. With Remote_Media_Device, there are a number of potential exceptions to a generic, or default, session. Accordingly, to demonstrate the value of the invention, the following description illustrates exemplary, non-limiting exceptions to a generic session for a device called Remote_Media_Device, which are automatically and dynamically handled by the media capabilities declaration mechanism of the invention.

Animated, center-locking start menu design does not work on non-animated Remote_Media_Device sessions. Thus, Remote_Media_Device sessions utilize an unanimated start menu design, where the highlight cursor is moved instead of the menu itself. With respect to window controls and username, the min/max/close/logoff buttons are removed for the Remote_Media_Device remote experience and Remote_Media_Device users cannot utilize fast user switching or control window settings. CD functionality, such as CD copying, is not supported on remoted sessions. Visualizations are not supported on Remote_Media_Device-remoted sessions since visualizations are very bandwidth, processor and memory intensive. The 'more info' button is disabled for photos on Remote_Media_Device-remoted sessions. DVD functionality is not remoted to a Remote_Media_Device either. Thus, the "Play DVD" menu item should be removed from the start menu for Remote_Media_Device-remoted sessions and DVD-related settings should also be removed.

Alpha-blended assets display incorrectly over video in a Remote_Media_Device display. Thus, custom assets are used for Remote_Media_Device-remoted sessions to avoid the single-pixel alpha problem. Alpha ellipses require a significant amount of custom alpha GDI coding and are not implemented for Remote_Media_Device sessions. Marquee scrolling requires D3D rendering and is disabled on Remote_Media_Device. Remote_Media_Device utilizes the TV skin by default. Also, since certain button names do not fit within the button containers currently, a smaller text size is used to address truncated button labels on Remote_Media_Device-remoted sessions.

The Help and Support Center (HSC) is launched in Remote_Media_Device-remoted sessions, as there is no way to close the HSC without a keyboard/mouse, and the HSC is not usable on the resolution of most TV screens. Thus, no links to the HSC are displayed on Remote_Media_Device-remoted sessions. Help links are removed during Remote_Media Device-remoted sessions for all first-run/settings pages. Since no keyboard or mouse is available on a Remote_Media_Device, no pop-ups are displayed.

The Remote_Media_Device client will be set up as a new user on the host machine. The Remote_Media_Device-remoted session will be set to run exclusively in full screen, and by default will run "always on top," preventing any rogue popups from being displayed over the UI. Furthermore, the Remote_Media_Device account disallows the installation of any ActiveX controls.

The fully animated wait cursor is not shown on Remote_Media_Device-remoted sessions. Instead, a custom version is shown, which is animated at a much lower frame rate and does not rely on a D3D-based animation scheme. Overlays that are displayed on mouse movement should not be shown on Remote_Media_Device-remoted sessions since there is no mouse. For Remote_Media_Device devices, all front panel display (FPD) events are to be sent to a "null" FPD device to ensure that they are not sent to the host PC's FPD.

Thus, it is clear that there are a myriad of media capabilities properties that could be automatically set by the framework of the invention for declaring media capabilities to the host device. Because the invention provides a framework that is extensible to additional media capabilities, and because the invention engages dynamically upon the start of a remote media experience session, the number of different media device scenarios operating remotely in cooperation with a host PC is limitless. Since the invention operates automatically for a session, the user need only turn a remote device on, and observe the customized media experience delivered to the remote device. For instance, with the above-described Remote_Media_Device, all of the above exceptions will be handled automatically. The Remote_Media_Device will declare its media capabilities string to the host PC, based upon which the host PC will interpret the device's media capabilities, and deliver a remote media experience accordingly.

There are multiple ways of implementing the present invention, e.g., an appropriate API, tool kit, driver code, operating system, control, standalone or downloadable software object, etc. which enables applications and services to use the media capabilities declaration mechanism of the invention. The invention contemplates the use of the invention from the standpoint of an API (or other software object), as well as from a software or hardware object that receives or transmits media capabilities via the mechanism of the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to remote a media experience. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the media capabilities mechanism(s) of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer or distributed networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of RDP, the invention is not so limited, but rather any protocol may be implemented to provide a general framework for declaring device media capabilities, prior to delivering a remote media experience to the device, e.g., at the start of a remote computing session. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for enabling a custom remote computing media experience as between a host device and a remote device, comprising the following steps:

instantiating a remote session with the host device according to a remote session protocol;

automatically transmitting at least one media capabilities token based upon a set of media functions supported by the remote device to the host device;

automatically generating said at least one media capabilities token based upon the set of media functions supported by the remote device in response to a connection between the host device and the remote device;

in response to said transmitting, receiving at the remote device a custom remote media experience user interface tailored to the remote device via a user interface channel, the remote media experience user interface enabling only the media functions supported by the remote device as indicated by the transmitted at least one media capabilities token; and, receiving at the remote device a media component from the host device via a media channel.

2. A method according to claim 1, wherein said remote session is a Terminal Server session and said remote session protocol is remote desktop protocol.

3. A method according to claim 1, further comprising the following steps:
  disconnecting said remote device from said remote session; and,
  automatically regenerating said at least one media capabilities token based upon the set of media functions supported by the remote device upon reconnecting to said remote session.

4. A method according to claim 1, wherein said at least one media capabilities token is a string.

5. A method according to claim 1, wherein said instantiating a remote session step includes establishing a remote session between a shell of the host device having remote control capabilities and the remote device.

6. A method according to claim 1, further comprising the following steps:
  generating said at least one media capabilities token by a third party tool; and,
  incorporating said at least one media capabilities token into software of the remote device.

7. A method for enabling a custom remote computing media experience as between a host device and a remote device, comprising the following steps:
  initializing a remote desktop protocol session of the host device;
  opening a virtual channel;
  monitoring the virtual channel for the remote device to establish a connection until a timeout period expires;
  upon the remote device connecting via the virtual channel, receiving from the remote device at least one media capabilities token automatically generated by the remote device based upon a set of media functions supported by the remote device and in response to the remote device connecting via the virtual channel;
  transmitting a custom media experience user interface to the remote device via a user interface channel based upon said at least one media capabilities token, the custom media experience user interface enabling only the media functions supported by the remote device;
  if no valid media capability token is received from the remote device within the timeout period, assuming a generic set of media functions supported by the remote device and transmitting a media experience user interface to the remote device via the user interface channel, the media experience user interface enabling the generic set of media functions; and,
  transmitting a media component to the remote device via a media channel.

8. A method according to claim 7, wherein said connection includes a connection to a shell of the host device having remote control capabilities.

9. A method according to claim 7, wherein said remote desktop protocol session is a Terminal Server session.

10. A computer readable storage medium comprising computer executable modules having computer executable instructions for enabling a custom remote computing media experience as between a host device and a remote device, said computer executable instructions comprising:
  instructions for instantiating a remote session with the host device according to a remote session protocol;
  instructions for automatically transmitting at least one media capabilities token based upon a set of media functions supported by the remote device to the host device;
  instructions for automatically generating said at least one media capabilities token based upon the set of media functions supported by the remote device in response to a connection between the host device and the remote device;
  instructions for receiving at the remote device a custom remote media experience user interface via a user interface channel tailored to the remote device in response to said transmitting, the remote media experience user interface enabling only the media functions supported by the remote device as indicated by the transmitted at least one media capabilities token; and,
  instructions for receiving at the remote device a media component from the host device via a media channel.

11. A computer readable storage medium according to claim 10, wherein said remote session is a Terminal Server session and said remote session protocol is remote desktop protocol.

12. A computer readable storage medium according to claim 10, further comprising:
  instructions for disconnecting said remote device from said remote session; and,
  instructions for automatically regenerating said at least one media capabilities token based upon the set of media functions supported by the remote device upon reconnecting to said remote session.

13. A computer readable storage medium according to claim 10, wherein said at least one media capabilities token is a string.

14. A computer readable storage medium according to claim 10, further comprising instructions for establishing a remote session between a shell of the host device having remote control capabilities and the remote device.

15. A computer readable storage medium comprising computer executable instructions for enabling a custom remote computing media experience as between a host device and a remote device, comprising:
  instructions for initializing a remote desktop protocol session of the host device;
  instructions for opening a virtual channel;
  instructions for monitoring the virtual channel for the remote device to establish a connection until a timeout period expires;
  instructions for receiving from the remote device at least one media capabilities token automatically generated by the remote device based upon a set of media functions supported by the remote device upon the remote device connecting via the virtual channel;
  instructions for transmitting a custom media experience user interface to the remote device via a user interface channel based upon said at least one media capabilities token, the custom media experience user interface enabling only the media functions supported by the remote device;

instructions for, if no valid media capability token is received from the remote device within the timeout period, assuming a generic set of media functions supported by the remote device and transmitting a media experience user interface to the remote device via the user interface channel, the media experience user interface enabling the generic set of media functions; and, instructions for transmitting a media component to the remote device via a media channel.

16. A computer readable storage medium according to claim 15, wherein said connection includes a connection to a shell of the host device having remote control capabilities.

17. A computer readable storage medium according to claim 15, wherein said remote desktop protocol session is a Terminal Server session.

18. A system for enabling a custom remote computing media experience, comprising:

a host device;

a remote device connected to said host device, wherein said remote device declares to said host device a set of media functions supported by the remote device by transmitting at least one media capabilities token automatically generated by the remote device based upon a set of media functions supported by the remote device and in response to the remote device connecting to the host device;

a user interface channel through which said host device transmits a user interface to said remote device tailored to the media capabilities of said remote device as indicated by the transmitted at least one media capabilities token, the user interface enabling only the media functions supported by the remote device; and, a media channel through which said host device transmits bandwidth intensive media to said remote device.

19. The system of claim 18, wherein media transmitted by said media channel is synchronized with said user interface transmitted by said user interface channel.

20. The system of claim 18, wherein media transmitted by said media channel is sent out of band with respect to said user interface transmitted by said user interface channel.

21. The system of claim 18, wherein said user interface channel and said media channel are separate.

* * * * *